J. & J. A. CROOK.
SAW-GUMMER.
No. 184,845. Patented Nov. 28, 1876.
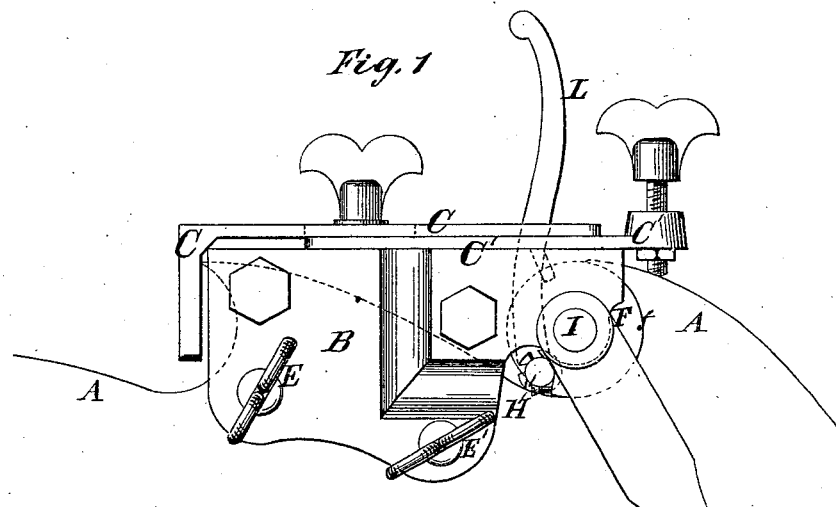
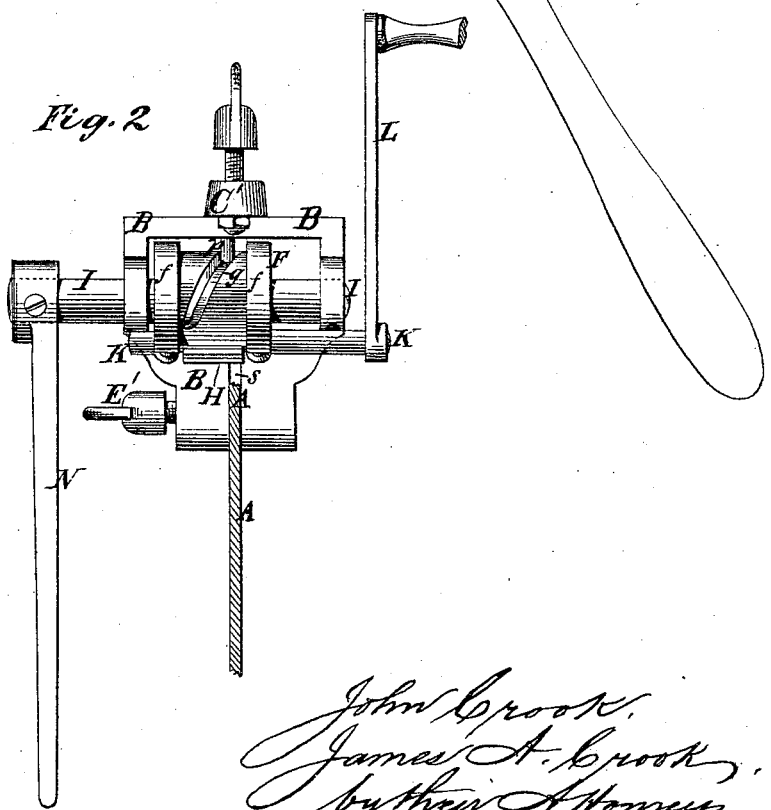
Witnesses:
Michael Ryan
Fred. Haynes
John Crook
James A. Crook
by their Attorneys
Brown & Allen

UNITED STATES PATENT OFFICE.

JOHN CROOK AND JAMES A. CROOK, OF AUGUSTA, ASSIGNORS OF ONE-HALF THEIR RIGHT TO J. WENDELL COLE, OF COLUMBUS, OHIO.

IMPROVEMENT IN SAW-GUMMERS.

Specification forming part of Letters Patent No. 184,845, dated November 28, 1876; application filed October 14, 1876.

*To all whom it may concern:*

Be it known that we, JOHN CROOK and JAMES A. CROOK, both of Augusta, in the county of Carroll and State of Ohio, have invented an Improvement in Saw-Gummers; and we do hereby declare that the following is a full, clear, and exact description of the same, reference being had to the accompanying drawing, which forms a part of this specification.

Our invention, which we have styled "concentric saw-gummers," relates to that class of saw-gummers in which the gumming is effected by means of a milling-tool; and it consists in such a construction and arrangement of the parts of the saw-gummer that the milling-tool, when operated as hereinafter described, has three motions imparted to it, to wit: a rotary motion on its own axis, a longitudinal motion in the direction of its axis of rotation, and a motion of revolution around a center, which is also the center of the circular arc forming the innermost portion of the indentation between any two consecutive teeth of the saw after the saw has been gummed by the action of the milling-tool, as hereinafter set forth.

The object of the longitudinal motion of the milling-tool in the direction of its axis of rotation is to give said tool what is known to mechanics as a "draw-cut," and to use the full face of the tool; and the object of the revolution about the aforesaid center is to give the required contour to the indentations which separate the teeth of the saw, and also to shape the teeth properly on their inner sides.

Figure 1 in the drawing is a side view of our improved saw-gummer attached to a saw as when in use. Fig. 2 is a front view of the same.

A represents the saw, to which the gummer is attached. B is the frame which supports the working parts. The said frame is preferably made in a single piece, and of cast metal, and it is provided with a slot, $s$, Fig. 2, which in use is slipped onto the outer border of the saw and the frame B, being adjusted to the proper relation with the saw by means of the adjustable gages C C', is fastened firmly to the border of the saw by means of the set-screws E E'.

Pivoted to the frame B is the flanged carrying-cylinder F, in the flanges $ff$ of which are fitted the journals of the arbor of the milling-tool H, the axis of said milling-tool being parallel to the axis of the cylinder F.

The cylinder F has a helical cam-groove, $g$, Fig. 2, formed in its central part, and a pin, $p$, Fig. 2, rigidly attached to the upper part of the frame B, descends into said cam-groove.

It is obvious that the rotation of the cylinder F upon its axis I will cause the milling-tool H to traverse in a circle around said axis I, and also through the action of the pin $p$ and cam-groove $g$ to traverse longitudinally on the said axis I, Fig. 2, which arbor K is made long enough to permit the required longitudinal traverse to give the milling-tool the required draw-cut.

In use the frame is adjusted and fastened to the saw, as hereinbefore described, the crank L is attached to the arbor K of the milling-tool H, and the lever N is attached to the axis I of the cylinder F. The gumming is then performed by turning the crank L, and simultaneously feeding the tool along by moving the lever N, which not only performs the feeding, but gives the milling-tool a draw-cut, as hereinbefore set forth.

We claim—

1. The combination, in a saw-gummer, of a frame, a carrying-cylinder, arranged to oscillate or rotate on its axis in said frame, and a rotary milling-tool arranged eccentrically to said carrying-cylinder in bearings provided thereon, substantially as herein described.

2. The combination of the flanged cylinder F, having the helical cam-groove $g$, the milling-tool H, having its arbor K fitted to bearings in the flanges $ff$ of the cylinder F, and the frame B, having the slot $s$, the set-screws E E', and the pin $p$ entering the cam-groove $g$ of the cylinder F, substantially as and for the purposes set forth.

3. The combination of the frame B, the adjustable gages C C', the carrying-cylinder F, and the milling-tool H pivoted to the said carrying-cylinder, substantially as and for the purposes herein described.

JOHN CROOK.
JAMES A. CROOK.

Witnesses:
J. B. ROACH,
JOHN A. ROACH.